United States Patent [19]

Nelson

[11] Patent Number: 4,830,556
[45] Date of Patent: May 16, 1989

[54] PLASTIC RIVET HAVING FLEXIBLE DRIVE PIN

[75] Inventor: John F. Nelson, New Lenox, Ill.

[73] Assignee: Illinois Tool Works Inc., Chicago, Ill.

[21] Appl. No.: 69,379

[22] Filed: Jul. 1, 1987

[51] Int. Cl.$^4$ ............................................. F16B 13/04
[52] U.S. Cl. ........................................ 411/41; 411/509
[58] Field of Search ................... 411/41, 40, 44, 45, 411/46, 510, 60, 508, 509, 48

[56] References Cited

U.S. PATENT DOCUMENTS

| | | | |
|---|---|---|---|
| 2,542,144 | 2/1951 | Kearns | 411/41 |
| 3,323,404 | 6/1967 | Fischer | 411/60 |
| 3,918,130 | 11/1975 | Poe | 24/453 |
| 4,426,181 | 1/1984 | Omata | 411/33 |
| 4,571,134 | 2/1986 | Berlinger et al. | 411/41 |

FOREIGN PATENT DOCUMENTS

| | | | |
|---|---|---|---|
| 44-7768 | 4/1969 | Japan | 411/41 |
| 536067 | 5/1941 | United Kingdom | 411/510 |

Primary Examiner—Lloyd A. Gall
Assistant Examiner—Curtis B. Brueske
Attorney, Agent, or Firm—John P. O'Brien; Thomas W. Buckman

[57] ABSTRACT

A two piece rivet having a deflectable drive pin for retaining the drive pin in a partially inserted position between the expandable prongs of the rivet is disclosed. The deflectable drive pin includes a hole forming two parallel resiliently deflectable segments each having a radial nib resiliently urged against the head of the rivet in a central drive pin hole. Retention of the drive pin in the fully inserted position between the prongs is effected by a pair of spaced apart circumferential interrupted grooves on the pin receiving projections on inner surfaces of the rivet prongs.

11 Claims, 2 Drawing Sheets

PLASTIC RIVET HAVING FLEXIBLE DRIVE PIN

BACKGROUND OF THE INVENTION

This invention relates to a two piece plastic fastener. More particularly, the invention relates to a plastic rivet of the type having an expandable portion and a drive pin molded as a single piece. This type of plastic rivet has a drive pin molded to a frangible member over a hole in fastener's head. After insertion of an expandable prong and a portion of the body of the rivet in a hole provided in the members to be fastened together, the drive pin is driven into the body to break the frangible member. Converging tapered surfaces on the prongs are engaged by the drive pin which causes the prong to expand apart. Retention means between the drive pin and prongs holds the drive pin in place with the prongs expanded against the backside of the part.

It is desirable in such a rivet that the drive pin be predriven after molding of the part to an intermediate position within the body of the rivet whereat the prongs are not yet expanded. Means for retaining the drive pin in the predriven position must be provided for.

SUMMARY OF THE INVENTION

Accordingly, it is the object of the present invention to provide a plastic fastener of the general type described above which includes means for retaining the drive pin in a predriven state.

According to the invention, the drive pin is provided with means for frictionally retaining the drive pin in a hole in the head of the fastener against axial movement in a preassembled, partially inserted position of the pin between the prongs.

An important feature of the invention provides for a resiliently, deflectable portion on the drive pin which resiliently, frictionally engages the head of the fastener in the hole in the head. The resiliently deflectable portion is disposed on the drive pin at a location proximate the end of the pin which is attached to the head of the fastener providing for retention of the drive pin at a partially inserted position.

An important feature of the invention provides for the resiliently deflectable portion to be a pair of resilient segments of the pin as formed by a hollowed out portion in the pin. In particular, the hollowed out portion is a transverse hole in the pin forming two parallel outer segments at the pin's outer boundary.

According to another feature of the invention, the drive pin is provided with at least one radial protrusion on the outer surface at the resilient segment. The protrusion engages the head in the hole causing the resilient segment to be urged against the head.

Advantageously, the drive pin is frictionally retained in the partially inserted position.

Another feature of the invention provides for a pair of protrusions one on each deflectable segment, each protrusion resiliently urged against the head.

According to a further important feature of the invention, means for retaining the drive pin in a fully inserted position between the fastener's prongs with the prongs deflected apart is provided for including a pair of parallel, spaced apart, interrupted grooves between one end of the drive pin and the resiliently deflectable portion. The grooves receive raised edges provided on the inner surfaces of the prongs and axially retain the drive pin in the fully inserted position.

BRIEF DESCRIPTION OF THE DRAWINGS

The invention will be better understood after a reading of the detailed description of the preferred embodiment in conjunction with the drawings in which.

DETAILED DESCRIPTION OF THE PREFERRED EMBODIMENT

Figure 1:
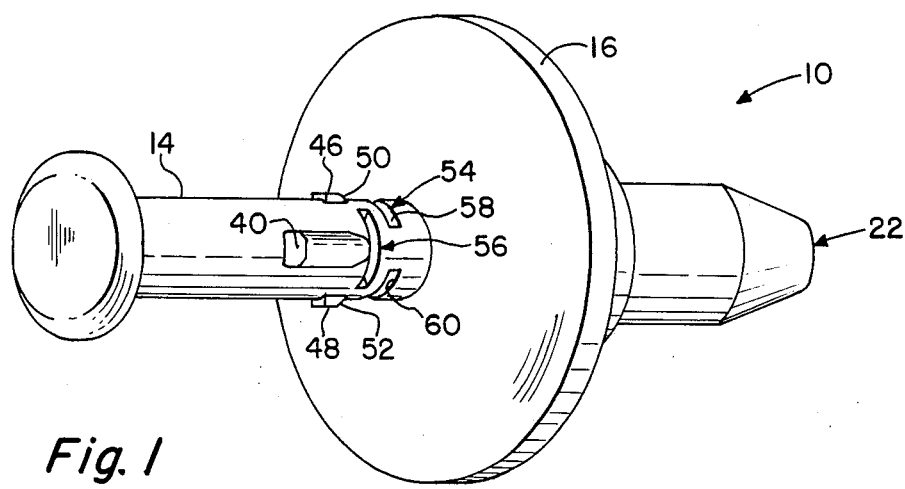
FIG. 1 is a pictorial view of the plastic rivet according to the invention.

Shown in FIG. 1 is a two piece plastic fastener 10. The fastener 10 is a plastic rivet-type fastener having a body 12 and a drive pin 14 preferably molded as one piece. While the body and drive pin are preferably molded as one piece as described below, it is to be understood that the drive pin 14 and body 12 can be manufactured as separate parts and then preassembled as set out below. The body 12 is provided with a head 16, shown as, but not limited to, circular in shape. The body 12 includes a central hole 18 which forms a complete diameter in the head 16. The body is also slotted at 20 longitudinally along its axis from the full diameter hole in the head to its free end 22 forming a pair of prongs 24, 26. As shown in dashed line in FIG. 3, the hole 18 extends longitudinally at 28, 30 into the prongs and is tapered at one end forming a pair of arcuate tapered surfaces 32, 34 on the inside surface of each prong. The hole 18 and portions 28, 30 extend along the prongs and are substantially the same diameter as the drive pin 14. As described hereinbelow, the hole and portions in the prongs guide the drive pin between the prongs and the convergent tapered portions 32, 34, when contacted by the drive pin, spread the prongs apart. As stated, the drive pin 14 and the body 12 are molded as one piece. The drive pin 14 is molded to the head 16 through a frangible member in the form of a thin flashing 36 at the end of the pin across the hole 18.

Figure 2:
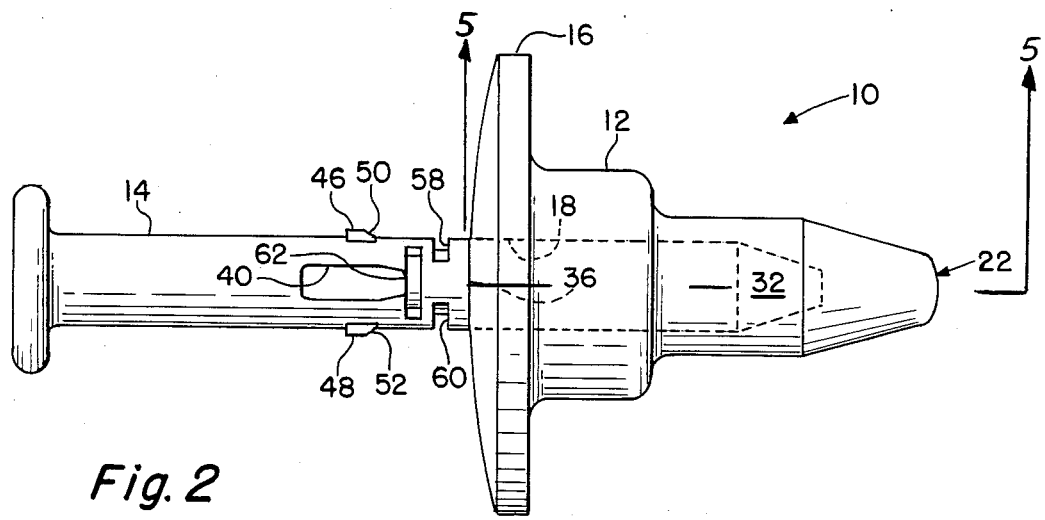
FIG. 2 is a side view of the plastic rivet of FIG. 1 showing details of construction.
Figure 3:
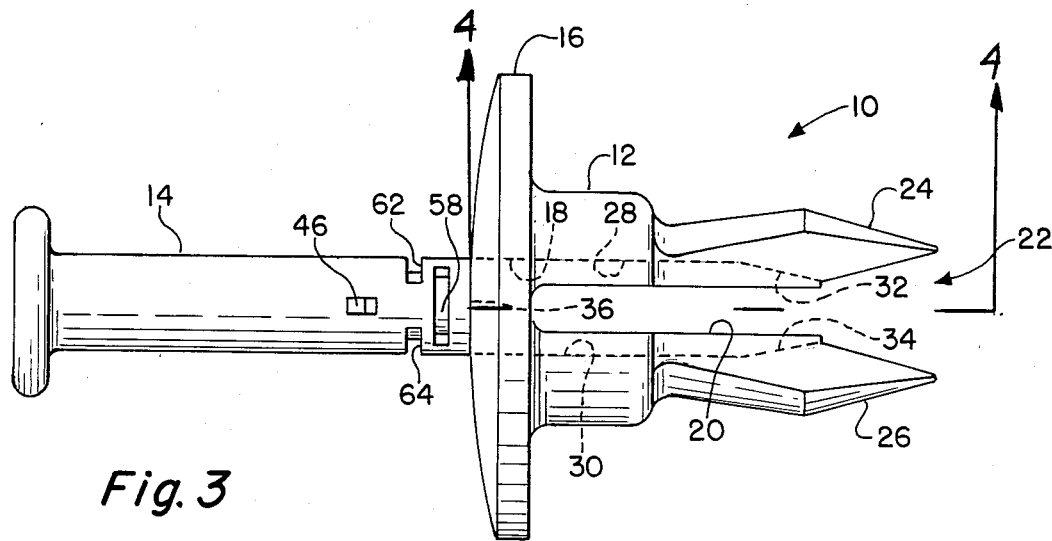
FIG. 3 is another side view of the plastic rivet of FIG. 1 shown 90 degrees from the view of FIG. 2 showing further details of construction.
Figure 4:
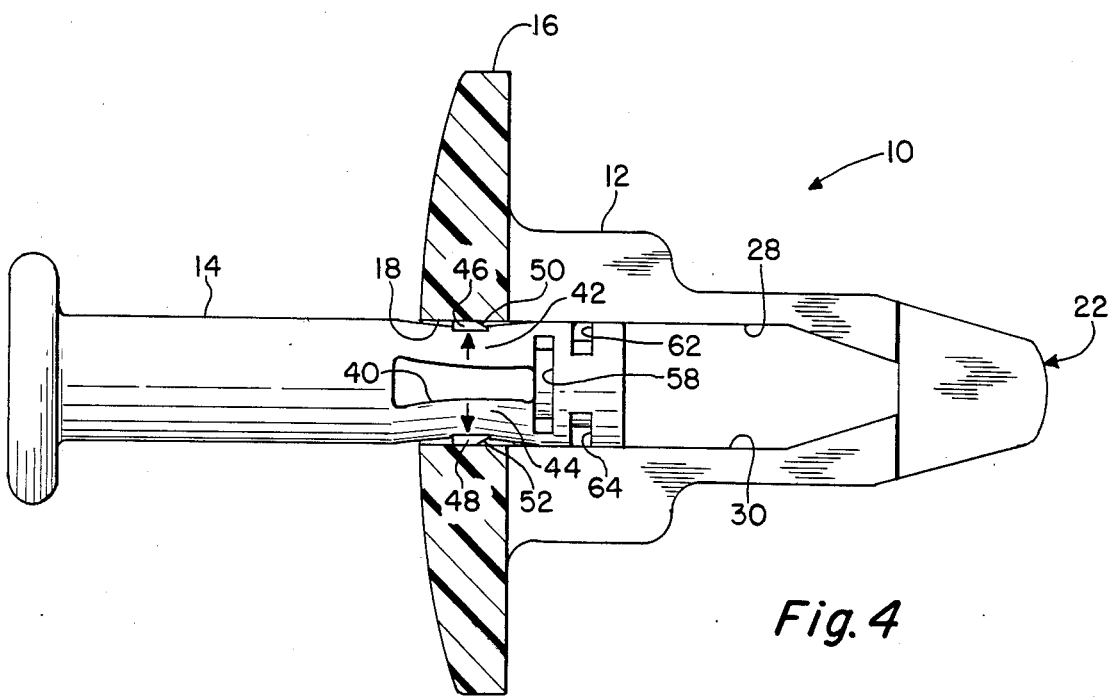
FIG. 4 is a vertical longitudinal cross sectional view through 4—4 of FIG. 3 with the drive pin in the partially inserted position showing further details of construction.

Referring now principally to FIGS. 2, 3 and 4, it is desirable to preinsert the drive pin 14 partially into the body 12 between the prongs 24, 26 without initiating any deflection of the prongs. The drive pin is provided with means for holding the drive pin 14 in a partially inserted position as shown in FIG. 4. The retention means includes a resiliently, radially, deflectable portion on the pin at a location along its length for holding the pin at a desired partially inserted position. The resiliently, deflectable portion is urged against the head in the hole 18 and frictionally retains the pin to the head. The resiliently deflectable portion includes a hollowed out portion in the form of a transverse hole 40. The hole 40 shown is elongated but can be other shapes if desired to impart a desired resiliency to the flexible portion. The hole 40 forms two opposing deflectable walls or segments 42, 44. A pair of protrusions in the form of nibs 46, 48 are provided on the outer surface of the segments 42, 44 and preferably are disposed 180 degrees apart and centrally on the segments 42, 44. Each nib is provided a tapered ramp 50, 52. The nibs extend beyond the diameter of the hole 18 in the head.

Figure 5:
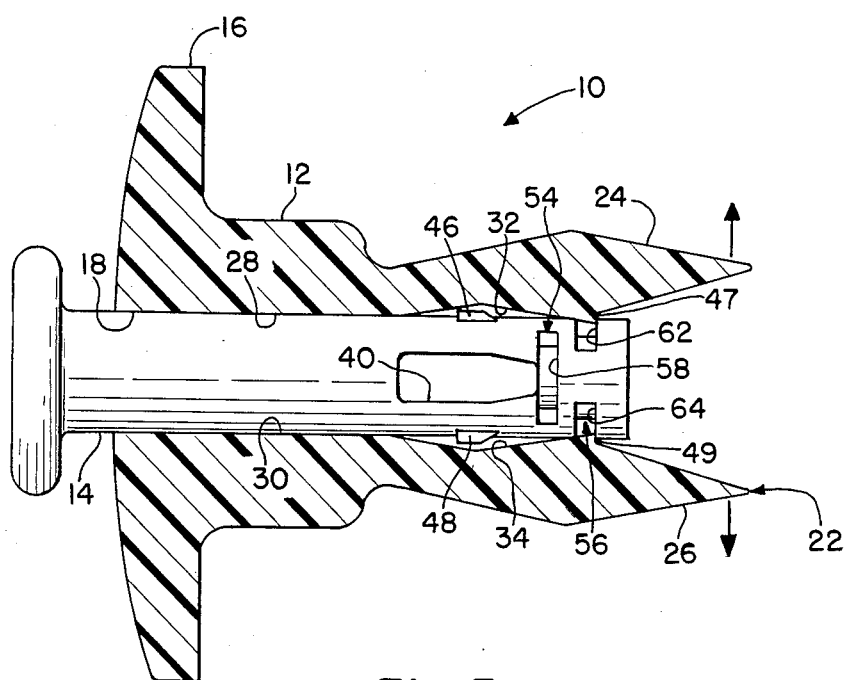
FIG. 5 is a vertical longitudinal cross section through 5—5 of FIG. 2 with the pin rotated 90 degrees from that of FIG. 3 engaged to the prongs in the fully inserted position showing further details of construction.

As shown in FIG. 3, when the drive pin is to be prepositioned partially in the body, the pin is driven to break the frangible flash and axially move into the hole 18. The ramps 50, 52 contact the head 12 at the edge of the hole 18 and cause the deflectable segments 42, 44 to deflect radially inwardly. The plastic segments are resilient and accordingly urge the nibs radially outwardly to frictionally hold the pin 19 in the partially inserted position. Of course the retention provided by the resiliently deflectable portion can be overcome upon further application of additional force on the drive pin to drive the pin to the fully inserted position according to FIG. 5. The frictional retention provided can be adjusted by changing any desired combination of factors such as, hole size including diameter and elongation, as well as the degree of protrusion of the nibs. Other configurations are possible including, for example, cross drilled or molded apertures forming multiple deflectable segments and/or a multiplicity of protrusions.

Once fully inserted during fastening, the drive pin is retained in the fully inserted position to hold the prongs in the deflected state behind a panel in wellknown fashion. The fully inserted pin retention means of the present invention includes a shoulder 47, 49 at the end of each of the converging tapered portions 32, 34 which shoulders are resiliently received in one of two grooves 54, 56 between the end of the pin and the hole 40. While a single continuous groove, not shown, can be provided, it has been found that greater axial retention is received with a pair of spaced apart, parallel, interrupted grooves as shown in the drawings. Preferably, each groove includes at least a pair of slots equally distributed around the periphery of the pin. The adjacent interrupted groove is comprised of an equal number of at least two slots also equally spaced around the periphery of the pin and circumferentially offset from the adjacent groove such that there are alternating adjacent full diameter surfaces and slots. Pull tests, whereupon the drive pin is subjected to an axial force in a direction to retract the pin from the fully inserted position, have demonstrated that the described spaced, interrupted grooves provide substantially increased axial holding efficiency over a single continuous groove.

Having described the preferred embodiment of the invention, those skilled in the art having the benefit of the description and the drawings can readily devise other embodiments and modifications. Therefore, such other embodiments and modifications are to be considered to be within the scope of the appended claims.

What is claimed is:

1. A molded rivet, comprising a body including a head and a central hole in said body and head,
    a pair of elongated spaced apart deflectable prongs extending from one side of said head at opposite locations relative to said hole,
    a drive pin premolded to said head at a side of said head opposite said one side coaxial with said hole including frangible means at said hole connecting said drive pin to said head,
    means on said prongs cooperating with said drive pin for increasing the spacing between said prongs at least at a fully inserted position of said drive pin between said prongs means for frictionally retaining said drive pin in a partially inserted position in said central hole against axial movement including means for radially urging a portion of said drive pin against said head in said hole, said means for radially urging said portion of said pin against said head includes said pin including a resiliently deflectable portion.

2. The plastic rivet as defined in claim 1 wherein said pin includes a hollowed out portion defining at least one deflectable segment and at least one protrusion on said pin at said deflectable segment, said at least one protrusion radially engaged against said head in said hole in the partially inserted position with said deflectable segment radially inwardly deflected.

3. The plastic rivet as defined in claim 2 wherein said hollowed out portion is a transverse hole in said pin forming a pair of resiliently deflectable segments and a pair of nibs, one nib on each of said deflectable segments.

4. The plastic rivet as defined in claim 3 wherein each of said nibs includes ramp means for engaging said head at an edge of said hole for deflecting said resiliently deflectable segments toward each other.

5. The plastic rivet as defined in claim 1 wherein said means for retaining said drive pin in the fully inserted position includes a pair of parallel spaced apart interrupted grooves in said drive pin proximate an end of said drive pin whereat said drive pin is attached to said head, and at least one projection means on said prongs for engaging one of said interrupted grooves.

6. The plastic rivet as defined in claim 5 wherein said projection means on said prongs is defined by the junction of a tapered surface on said prongs and a shoulder on said prongs.

7. A plastic rivet, comprising
    a body including a central hole and a pair of parallel spaced apart deflectable prongs extending from one side of said body, said hole opening between said prongs,
    drive pin means adapted for receipt in said central hole for slidable movement between a partially inserted position and a fully inserted position between said prongs,
    said drive pin means cooperating with means associated with said prongs for deflecting said prongs to increase the spacing therebetween with said drive pin means in said fully inserted position between said prongs,
    means for retaining said drive pin means in the fully inserted position, and
    means for frictionally retaining said drive pin means to said body in a partially inserted position in said hole against axial movement including an aperture in said drive pin means defining a pair of resiliently deflectable segments and a protrusion on each of said resiliently deflectable segments adapted to radially engage said body in said hole in the partially inserted position, said resiliently deflectable segments radially inwardly deflected in the partially inserted position and urging said protrusions radially outwardly against said body in said hole.

8. A plastic rivet, comprising
    a body including an expanded head having a central hole, a pair of spaced apart parallel deflectable prongs extending from one side of said head coaxial with said hole,
    a drive pin affixed at one end to said head on a side of said head opposite said one side coaxial with said hole by frangible means providing for entry of said drive pin into said hole, means associated with said drive pin and said prongs for deflecting said prongs and retaining said pin in a fully inserted position between said prongs, and means for frictionally retaining said drive pin in a partially inserted position in said hole against axial movement including a resiliently deflectable portion of said drive pin at a location proximate said one end thereof and at least one protrusion on said drive pin at said resiliently deflectable portion, said protrusion urged by said resiliently deflectable portion radially into engagement with said head in said hole.

9. The plastic rivet as defined in claim 8, wherein said means for deflecting includes converging tapered surfaces on said prongs engaged by said drive pin at least in the fully inserted position and said means for retaining said drive pin in the fully inserted position includes at least one groove in said drive pin and a projection defined by said tapered surfaces received in said groove.

10. The plastic rivet as defined in claim 9 wherein said at least one groove includes two spaced apart circumferential interrupted grooves on said pin.

11. The plastic rivet as defined in claim 10 wherein each of said interrupted grooves includes at least two slots, the slots of one groove being circumferentially offset from the slots of the second groove.

* * * * *